United States Patent
Park et al.

(10) Patent No.: US 12,217,471 B2
(45) Date of Patent: *Feb. 4, 2025

(54) SYSTEMS AND METHODS REGION-OF-INTEREST AUTOMATIC GAIN OR EXPOSURE CONTROL

(71) Applicant: QUALCOMM Incorporated, San Diego, CA (US)

(72) Inventors: Edwin Chongwoo Park, San Diego, CA (US); Soman Ganesh Nikhara, Hyderabad (IN); Bapineedu Chowdary Gummadi, Hyderabad (IN); Pradeep Veeramalla, Hyderabad (IN); Ravi Shankar Kadambala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,462

(22) Filed: Nov. 16, 2023

(65) Prior Publication Data

US 2024/0087279 A1 Mar. 14, 2024

Related U.S. Application Data

(63) Continuation of application No. 17/030,113, filed on Sep. 23, 2020, now Pat. No. 11,847,808.

(Continued)

(51) Int. Cl.
*H04N 23/73* (2023.01)
*G06F 17/18* (2006.01)
(Continued)

(52) U.S. Cl.
CPC .............. *G06V 10/25* (2022.01); *G06F 17/18* (2013.01); *H04N 23/71* (2023.01); *H04N 23/73* (2023.01)

(58) Field of Classification Search
CPC ........ G06V 10/25; G06F 17/18; H04N 23/71; H04N 23/73; H04N 23/76
See application file for complete search history.

(56) References Cited

U.S. PATENT DOCUMENTS 5,712,682 A 1/1998 Hannah
9,313,415 B2 4/2016 Schieltz
(Continued)

FOREIGN PATENT DOCUMENTS

CN 106791475 B 8/2019

OTHER PUBLICATIONS

International Preliminary Report On Patentability—PCT/US2020/054438—The International Bureau of WIPO—Geneva, Switzerland—Apr. 28, 2022.

(Continued)

*Primary Examiner* — Twyler L Haskins
*Assistant Examiner* — Wesley J Chiu
(74) *Attorney, Agent, or Firm* — QUALCOMM Incorporated

(57) ABSTRACT

Methods, systems, computer-readable media, and apparatuses for region-of-interest (ROI) automatic gain or exposure control are presented. In one example, a method includes receiving a first image from an image sensor captured with a first field of view (FOV) and comprising a first plurality of pixels, receiving a second image from the image sensor captured with a second FOV and comprising a second plurality of pixels, determining an ROI in the second image, the ROI comprising a subset of the second plurality of pixels in the second image, determining an ROI weight for the ROI in the second image, determining statistics based on the first plurality of pixels in the first image, the subset of the second plurality of pixels in the second image, and the ROI weight for the ROI in the second image, (Continued)

and adjusting a gain or exposure setting for the image sensor based on the statistics.

26 Claims, 8 Drawing Sheets

Related U.S. Application Data

(60) Provisional application No. 62/914,600, filed on Oct. 14, 2019.

(51) Int. Cl.
*G06V 10/25* (2022.01)
*H04N 23/71* (2023.01)

(56) References Cited

U.S. PATENT DOCUMENTS

| | | | |
|---|---|---|---|
| 9,615,050 B2 | 4/2017 | Belman | |
| 10,306,152 B1 * | 5/2019 | Chu | H04N 23/71 |
| 10,855,894 B2 * | 12/2020 | Biasini | H04N 23/62 |
| 11,847,808 B2 * | 12/2023 | Park | G06V 10/25 |
| 2009/0002797 A1 * | 1/2009 | Kwong | H04N 23/58 |
| | | | 348/E5.04 |
| 2009/0003678 A1 | 1/2009 | Cutler | |
| 2014/0232895 A1 | 8/2014 | Schieltz | |
| 2016/0366326 A1 * | 12/2016 | Sen | G06T 7/20 |
| 2017/0230558 A1 | 8/2017 | Morales et al. | |
| 2018/0183986 A1 * | 6/2018 | Smith | H04N 23/743 |
| 2019/0222769 A1 * | 7/2019 | Srivastava | G06F 3/048 |
| 2020/0396367 A1 * | 12/2020 | Segapelli | H04N 23/61 |
| 2021/0110190 A1 | 4/2021 | Park et al. | |
| 2022/0345607 A1 * | 10/2022 | Li | B64C 39/024 |
| 2023/0005239 A1 * | 1/2023 | Xu | G06V 10/25 |

OTHER PUBLICATIONS

International Search Report and Written Opinion—PCT/US2020/054438—ISA/EPO—Jan. 19, 2021.

* cited by examiner

SYSTEMS AND METHODS REGION-OF-INTEREST AUTOMATIC GAIN OR EXPOSURE CONTROL

CROSS-REFERENCE TO RELATED APPLICATIONS

This application is a continuation of U.S. Non-Provisional application Ser. No. 17/030,113, filed Sep. 23, 2020, titled "Systems and Methods Region-Of-Interest Automatic Gain or Exposure Control" which claims the benefit of U.S. Provisional Application No. 62/914,600, filed Oct. 14, 2019, titled "Region-of-Interest Automatic Exposure Control," which are incorporated herein by reference in their entirety.

BACKGROUND

A digital camera captures images using an image sensor, which convert incoming light into electrical signals representative of light incident on the image sensor. The electrical signals output by the image sensor may represent color, brightness, intensity, or other information about the incident light. A processor that receives those electrical signals may then construct a graphical image having pixels, where the pixel values are based on the received electrical signals.

BRIEF SUMMARY

Various examples are described for systems and methods for region-of-interest automatic gain or exposure control. One example method includes receiving an image from an image sensor, the image comprising a plurality of pixels; determining a region of interest ("ROI") in the image, the ROI comprising a subset of the plurality of pixels in the image; determining a ROI weight for pixels in the subset of the plurality of pixels; determining statistics for the image based on the plurality of pixels in the image and the ROI weight; and adjusting a gain or exposure setting for the image sensor based on the statistics.

One example device includes a non-transitory computer-readable medium; and a processor communicatively coupled to the non-transitory computer-readable medium, the processor configured to receive an image from an image sensor, the image comprising a plurality of pixels; determine a region of interest ("ROI") in the image, the ROI comprising a subset of the plurality of pixels in the image; determine a ROI weight of pixels in the subset of the plurality of pixels; determine statistics for the image based on the plurality of pixels in the image and the ROI weight; and adjust a gain or exposure setting for the image sensor based on the statistics.

One example non-transitory computer-readable medium includes processor-executable instructions configured to cause a processor to receive an image from an image sensor, the image comprising a plurality of pixels; determine a region of interest ("ROI") in the image, the ROI comprising a subset of the plurality of pixels in the image; determine a ROI weight for pixels in the subset of the plurality of pixels; determine statistics for the image based on the plurality of pixels in the image and the ROI weight; and adjust a gain or exposure setting for the image sensor based on the statistics.

One example apparatus includes means for receiving an image from an image sensor, the image comprising a plurality of pixels; means for determining a region of interest ("ROI") in the image, the ROI comprising a subset of the plurality of pixels in the image; means for determining a ROI weight for pixels in the subset of the plurality of pixels; means determining statistics for the image based on the plurality of pixels in the image and the ROI weight; and means for adjusting a gain or exposure setting for the image sensor based on the statistics.

This illustrative example is mentioned not to limit or define the scope of this disclosure, but rather to provide examples to aid understanding thereof. Illustrative examples are discussed in the Detailed Description, which provides further description. Advantages offered by various examples may be further understood by examining this specification

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1A:
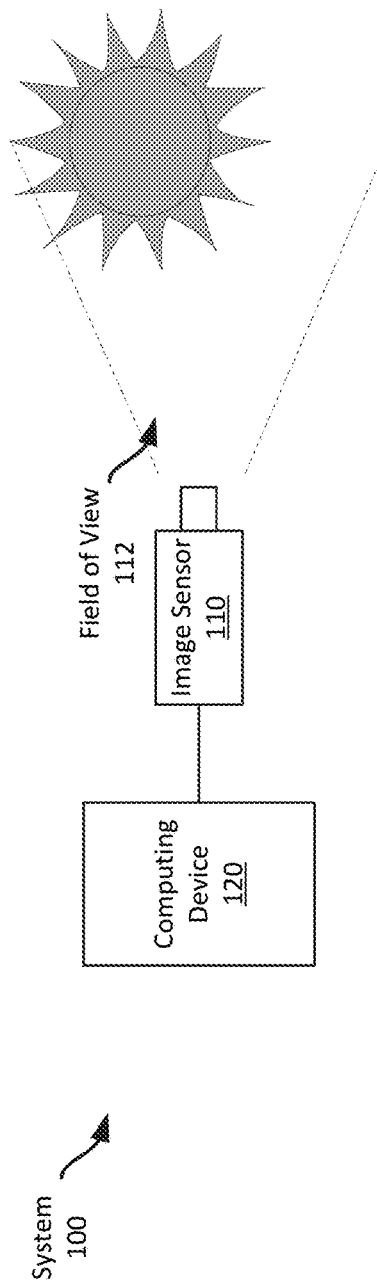
FIG. 1A shows an example environment for capturing an image.

Examples are described herein in the context of systems and methods for region-of-interest automatic gain or exposure control. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

When capturing an image with a digital camera, a user may try to avoid capturing bright light sources, such as the sun, in the image. Such light sources may wash out other portions of the image by saturating some or all of the pixels in the camera's image sensor. However, even if these light sources are not directly captured, they may still generate enough ambient light to make objects in an image overly bright.

To help mitigate the effect these light sources may have on captured images, an example digital camera includes automatic exposure or gain control for its image sensor. After capturing an image, the camera may calculate certain statistics based on the image, such as average brightness across the image, a standard deviation value based on the average brightness, etc. Based on these statistics, the camera can then adjust the gain control or exposure control for the image sensor for a subsequent image to reduce the gain or exposure time to compensate for an overly bright image or increase the gain or exposure time to compensate for an overly dark image.

Further, to help emphasize important parts of an image, one or more regions of interest (each an "ROI") may be identified. The ROIs may be used to adjust the statistics calculations based on pixels in the image. For example, an ROI may be used to more or less heavily weight pixels within the ROI than those outside of the ROI. Thus, weights for the pixels in the image may be set with most pixels being set to a default weight, e.g., 1, while pixels within the ROI may be set to a higher weight, e.g., 2. Thus, when the camera's processor receives an image from the image sensor, it may apply the weights to the pixel values and calculate image statistics using the weighted pixel values to adjust the gain or exposure control for the image sensor. As a result, pixels with a weight of 2 will tend to contribute more heavily to computed image statistics as compared pixels with a weight of 1. As a result, bright lighting conditions may be mitigated by applying higher weights to pixels corresponding to ROIs, while applying a default weight to the remainder of the pixels in the image.

In some cases, it may be difficult or impossible to avoid directly capturing images with bright objects, such as the sun. For example, stationary cameras, such as security cameras, may have fixed fields of view ("FOV") that may sometimes include a bright light source, like the sun or a streetlight. When computing statistics about the image, such as average brightness of the image, the camera may incorrectly determine that the ambient lighting condition is "midday," despite it being nighttime with a streetlight in the image.

To address the appearance of bright objects in an image, the camera identifies pixels in the captured image that are significantly brighter than the rest of the image by comparing pixel intensities to the average pixel intensity for the image and identifying one or more ROIs that includes pixels with intensities significantly above the average pixel intensity for the image. These ROIs (referred to as "negative" ROIs), unlike the ROIs discussed above (referred to as "positive" ROIs), represent light sources or bright regions, which may cause skewed image statistics. Thus, to achieve more accurate or desirable image statistics, e.g., average image brightness, etc., and consequently a better image, after the ROI(s) are identified, a weight is applied to each pixel in the image outside of the ROI(s) and a lesser weight is applied to each pixel in the image within the ROI(s). In this example, a weight of 1 is applied to each pixel outside of the ROI and a weight of 0 is applied to each pixel within the ROI. The camera then computes pixel statistics for the image based on the pixel values and the corresponding weights and then adjusts the gain or exposure control for the image sensor for the next image to be captured. Because the weights for the pixels in the ROI are set to 0, those pixels will effectively do not contribute to sums of pixel values when the pixel statistics are calculated and thus do not contribute to adjusting the gain or exposure timing.

Use of negative ROIs to adjust gains or exposure time (or both) for image capture devices may provide significant benefits in a number of settings. For example, images captured by cameras with fixed FOVs or that sweep fixed paths may benefit by reducing the impact of bright light sources, such as street lamps or the sun, on image quality. Further, the technique can be performed by internet-of-things ("IoT") devices that may have limited power sources to provide high quality but power-efficient image enhancement. For example, an IoT device may perform the method using only a single set of image statistics calculated per frame: the IoT device may compute statistics over all pixels in a first frame, then compute statistics based on detected ROIs (as discussed above) on a second frame, and adjust the gain or exposure control for the third frame, while computing new image statistics for the entire image using the third frame, and so forth. Thus, the IoT device may be able to avoid saturated images and update image statistics every other frame to maintain image quality, even if other aspects of the image change, e.g., a cloud obstructs the sun, the camera sweeps to show a new portion of a scene, etc.

This illustrative example is given to introduce the reader to the general subject matter discussed herein and the disclosure is not limited to this example. The following sections describe various additional non-limiting examples and examples of systems and methods for region-of-interest automatic gain or exposure control.

Figure 1B:
FIG. 1B shows an example image having regions of saturated pixels.

Referring now to FIGS. 1A-1B, FIG. 1A illustrates a system 100 oriented to capture images while facing in the direction of the sun. The system 100 includes an image sensor 110 and a computing device 120. The image sensor 110 includes one or more sensor elements that each generate signals based on photons striking the element. These signals are then output and amplified and used to generate an image. To capture images within a FOV 112, the computing device establishes gain or exposure settings for the signals output by the image sensor 110 and sends a signal to the image sensor 110 to capture an image. In response, the image sensor 110 samples the pixel values for each of the sensor elements and outputs an image including the pixel values. The computing device 120 receives the image and performs further gain or exposure control on the image sensor 110 by analyzing the image as will be discussed in more detail below.

The computing device 120 depicted in FIG. 1A may be any suitable device that can receive signals from the image sensor 110 and perform one or more methods according to this disclosure. In this example, the computing device 120 is a separate and distinct device from the image sensor 110, which is contained within a camera. The two devices 110, 120 are in communication with each other via any suitable communications mechanism. For example, the computing device 120 may be communicatively coupled to the image sensor 110 via a direct connection, e.g., universal serial bus ("USB"), or via networked connection, e.g., via a local-area network ("LAN"), a wide-area network ("WAN"), a wireless network (e.g., Wi-Fi), or a wireless wide-area network ("WWAN"). In some examples, the image sensor 110 may be integrated within the computing device 120. For example computing device 120 may be a consumer device such as a smartphone, a tablet, a laptop, a digital single-lens reflex ("DSLR") camera, etc. Further in some examples, the computing device 120 may be an IoT device, such as a home security camera, doorbell camera, child monitor, etc. Still further, in some examples, which will be described in more detail below with respect to FIG. 9, the image sensor 110 may incorporate some or all of the functionality discussed below into the image sensor hardware itself. For example, each pixel may include hardware to enable weighting of pixel values or to assist in computing pixel statistics. Still other example computing devices 120 or image sensors 110 may be employed in some examples according to this disclosure.

In scenarios like those depicted in FIG. 1A, where an image sensor 110 is oriented so that its FOV includes a bright object, one or more pixel values will have a very high or even saturated value relative to the dynamic range of the image sensor 110. For example, if each pixel value is eight bits, the maximum pixel value is 255. Thus, a pixel value of 255 (or even a lower value, such has 250) may indicate that the corresponding pixel element has saturated based on incoming photons. If the system uses automatic gain or exposure control to adjust the image sensor's gain or exposure time, these saturated values may impact the gain or exposure control and lead to underexposed images. However, the example system 100 depicted in FIG. 1A instead deemphasizes bright regions in an image by identifying either positive ROIs to brighten or negative ROIs to darken (the unmodified term "ROI" can refer to either variety).

To do so in this example, one or more ROIs are identified in an image captured by the image sensor. Default weights are then applied to each of the pixel values in the image. Then, the weights of any pixel values within the identified ROI(s) are adjusted either up (for positive ROIs) or down (for negative ROIs). The weight for each pixel is then applied to the corresponding pixel value, and the computing device 120 computes various statistics on the image using the weighted pixel values. By using such a methodology, the pixels to be emphasized (or deemphasized) are identified and their contributions to the image statistics are increased (or decreased).

Figure 2A:
FIG. 2A shows an example image having regions of saturated pixels and a selected region of interest.
Figure 2B:
FIG. 2B shows an example adjusted image based on the selected region of interest.

FIG. 1B shows an example image 110 captured under such lighting conditions. As can be seen, the image 110 includes a view out of a window facing the sun. The window portion of the image is almost completely saturated as a result of the incoming sunlight. FIGS. 2A and 2B illustrate the operation of the system 100 to adjust the image sensor's gain setting or exposure time to obtain a higher quality images. Examples according to this disclosure may adjust gain or exposure settings based on identified ROIs to correct for saturated pixels, e.g., corresponding to bright light sources, and improve image quality.

Referring now to FIGS. 2A and 2B, FIG. 2A shows the image 110 from FIG. 1B, but a positive ROI has been identified. As discussed above, a positive ROI identifies a region in the image that will have a greater impact on image statistics due to an increased weight than pixels within the image with within a positive ROI. In contrast a negative ROI identifies a region in the image that will have a lesser (or no) impact on the pixel statistics as a result of being assigned a reduced (or zero) weight.

In this example, the region of interest was selected by a user interacting with a graphical user interface ("GUI") presented by the camera, e.g., on a touch-sensitive display, and selecting the desired ROI; however, in other examples, ROIs may be selected automatically, using any suitable technique. Further, while the ROI in this example is rectangular, ROIs according to this disclosure may have any suitable shape or outline, including rectangular or square, circular, ovoid, triangular, or any arbitrary shape with a closed perimeter (including perimeters that include part of the edge of the image).

In this example, after the ROI is selected, the camera applies weights to each pixel value in the image, e.g., 1, and then applies a different weight to each pixel value in the ROI, e.g., 3. The weight to be applied to pixels within the ROI may be based on a predetermined ratio. In this example, a ratio of 3:1 has been selected for pixel weights within and outside of the ROI, respectively. In examples where different weights are applied to a single image, the weights may be directly applied according to the predetermined ratio to pixels within the ROI and to pixels outside of the ROI. For example, default weights may be assigned to every pixel outside of the ROI and the ROI weight of 3 may be applied to the pixels within the ROI. However, in some examples, pixel weights for an image and for pixels in an ROI may be determined or applied on successive images rather than in a single image.

For example, a camera may record video and apply pixel weights for the entire image in one frame, and for the next frame, ROI pixel weights may be applied only to pixels in an ROI (or multiple ROIs) in the next frame, e.g., a weight of 0 may be applied to all pixels outside of the ROI(s), and pixels within the ROI may have a non-zero, positive weight applied to them. The pixel weights for the two frames may then be added together and then used to calculate pixel statistics in the second frame, which may then be used to establish gain or exposure settings for the image sensor as discussed above. This may be the case where there is a hardware or software limitation (e.g., processing time or power) on computing image statistics that makes it more efficient to compute statistics over successive frames, as discussed above. Thus, in some examples, it may be advantageous to perform computations over multiple frames, such as described above.

Using such a technique, any weighting ratio between ROI pixels and non-ROI pixels may be accomplished. For example, to achieve a 2:5 ratio, a default weight of 2 may be applied to all pixels in a first image, and a weight of 3 may be applied to pixels in the ROI in a second image (with a weight of 0 applied to the remaining pixels). Adding the weights from the two images together results in a weight of 2 for pixels outside the ROI and a weight of 5 for pixels within the ROI. The weights may then be used to calculate weighted pixel statistics for the second image and to determine a gain value or exposure time for a third image.

The camera then calculates image statistics, e.g., average brightness (by summing the weighted pixel values and dividing by the number of pixels), total brightness (by summing all weighted pixel values), etc. using the applied weights. For example, the camera may apply the weight by multiplying the pixel value (or each color channel, in a color image) by the weight.

After applying weights to the pixels in the image, the computing device 120 adjusts the gain or exposure time on the output of the image sensor 110 based on the computed statistics, or it may adjust the exposure time for a subsequent image. For example, if the image sensor's gain setting has a range from 0 and 1, and if brightness values for pixels in the image may be any value between 0 and 255, the camera may adjust the gain to achieve an average pixel brightness of 150. If the gain setting for the image was 0.75 and the average brightness based on the weighted pixel values was 200, a new gain setting of 0.5625 may be used, such as the new gain setting for the next image. In a case where the camera is in a fixed position, e.g., a security camera or an IoT device with a camera, the new gain setting may quickly enable higher image quality in the next image. Further, the computing device 120 may perform this same gain adjustment after every frame, or periodically after some amount of time or some number of frames. In some examples, the computing device 120 may re-perform the gain adjustment if the computed pixel statistics change beyond a threshold amount. Similarly, the exposure time may be increased or decreased based on the pixel statistics using the same technique discussed above. For example, if an exposure time of 1/125 second is used to take the first image, adjusting the exposure time to achieve the target average pixel brightness might reduce the exposure time of 3/500 second.

FIG. 2B illustrates an image 210 that has been captured by the image sensor using the adjusted gain or exposure setting. As can be seen, many objects in the image 210 are now visible that previously had been saturated by the sun, including window blinds, trees, and other objects outside the window. Alternatively, the image 210 could be generated by re-processing the raw image sensor output from image sensor using the adjusted gain or exposure setting. Thus, by performing the positive ROI technique discussed above, the camera can provide higher quality images with less saturation resulting from bright light sources or bright ambient lighting.

Figure 3A:
FIG. 3A shows an example image having regions of saturated pixels and two selected regions of interest.
Figure 3B:
FIG. 3B shows an example adjusted image based on the selected regions of interest.

Referring now to FIGS. 3A-3B, FIGS. 3A-3B illustrate an example use of negative ROIs usable with systems and methods for region-of-interest automatic gain or exposure control according to this disclosure. FIG. 3A shows an example image 310 with regions of high pixel brightness or pixel saturation. In the image 310, the saturated regions have been identified by the computing device 120 based on pixel values above a saturation threshold. For example, the computing device 120 may analyze pixel values in the image 310 to identify one or more pixels having a saturated pixel value (or within a threshold amount of a saturated pixel values). In this image 310, the pixels in the image may have a value between 0 and 255, and the computing device 120 classifies any pixels with a value about a threshold value, e.g., 245, as saturated. In black and white or greyscale images, such as image 310, saturation may be determined based on a single value; however, for images with multiple color channels, saturation may be determined based on one or more color channels having a saturated (or nearly saturated) value. The computing device 120 may then identify clusters of such saturated pixel values, e.g., based on relative proximity to each other or to a reference location. If an identified cluster of saturated (or nearly saturated) pixels exceeds a threshold number of pixels or size, e.g., at least 3% of the total number of pixels in the image, the computing device may generated a ROI corresponding to the cluster of pixels. In this example, the ROIs 320, 322 are negative ROIs, generally as described above, and thus represent bright areas of the image that will have reduced weights when determining image statistics.

After determining the ROIs 320, 322, the computing device 120 establishes weights for each pixel in the image, e.g., 1, and then applies adjusted weights to the pixels within the ROIs 320, 322. In this example, the computing device 120 applies a weight of 0 to each pixel in the ROIs 320, 322. The computing device 120 then computes pixel statistics using the weighted pixel statistics. In this example, because the computing device 120 used a weight of 0 for pixels in the ROIs, the pixel values for those pixels do not contribute to the total brightness value, but remain part of the total pixel count. Thus, pixel statistics, such as an average brightness value or total brightness value, for the image based on the weighted pixel statistics will be less than the unweighted pixel statistics. The weighted pixel statistics may then be used to adjust the gain or exposure control. To adjust the gain value or exposure time, the weighted pixel statistics may be compared against a threshold and, based on a difference between the pixel statistics and the threshold, the gain value or exposure time for the entire image may be adjusted.

For example as discussed above, if the weighted pixel statistics are above a threshold value, e.g., the weighted average pixel brightness is 175, but the target pixel brightness is 150, the gain or exposure setting for the image sensor may be reduced for the next image. However, had the overly bright or saturated regions been evenly weighted to the other pixels in the image, the unweighted average pixel brightness would have been 220, resulting in a greater reduction in the gain or exposure setting and an overly dark image.

After adjusting the gain or exposure settings, a new image may be captured, which is illustrated in FIG. 3B. The gain or exposure setting, reduced based on the non-saturated portions of the first image 310, resulted in an image of acceptable brightness, enable crisper details and fewer areas washed out by nearby light sources or reflections. By using negative ROIs, the saturated pixel values in those regions may be deemphasized or omitted when considering the overall brightness of the image, thereby reducing skewed statistics resulting from those saturated pixel values that might result in an overly dark image.

It should be appreciated that ROIs (whether positive or negative) may overlap in some cases. Thus, to prevent a pixel being weighted twice (or more times) from being a member of multiple ROIs, the camera may identify overlapping ROI regions and zero all but one ROI weight for pixels in overlapping ROIs to ensure overlapping ROIs are not unduly weighted. In some examples, the camera may add the weights of the different ROIs, including overlapping regions, and the subtract the excess weighting due to the overlap. For example, if region A has weight a, region B has weight b, and overlap in region C, the weights may be summed as $(a*A)+(b*B)-(|a-b|*C)$. In some examples, it may be desirable to provide some increased weighting to the overlap region, such as by computing $(a*A)+(b*B)-((a+b)*C/2)$ or any other suitable ratio, since, if $a \neq b$, there may be ambiguity as to which weight should dominate. Further, any other suitable technique to determine weights in overlapping regions between multiple ROIs may be used.

As discussed above with respect to FIGS. 2A-2B, weights may be applied to the entire image in a first image and then weights may be applied to pixels within a ROI in a second frame. However, in the case of negative ROIs, the weights from the second image may be subtracted from the weights from the first image, rather than added, to obtain a set of weights to calculate weighted pixel statistics. Because subtraction may result in negative weights, in some examples, negative weights may instead be set to zero, which may prevent issues when calculating weighted pixel statistics using negative weight values.

Figure 4:
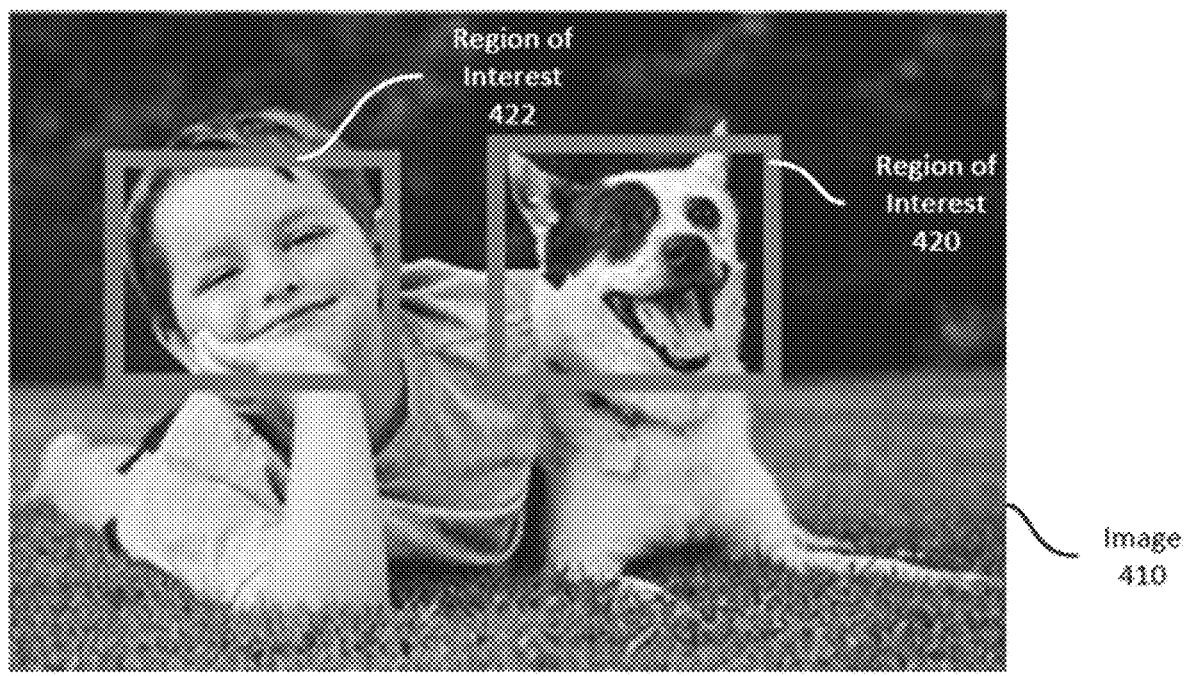
FIG. 4 shows an example user-defined ROI based on objects in an image.

Referring now to FIG. 4, FIG. 4 illustrates an example of a user-selected ROI. As discussed above ROIs may be identified to more or less heavily weight portions of an image to adjust gain or exposure settings for future image. In this example, positive ROIs are selected based on objects shown in an image. To enable such functionality, a device may capture a first image of a scene and display it for a user to review. The user may then identify objects of interest in the scene, such as by drawing an outline (e.g., a bounding box, silhouette, or other shape) around the object. The user-defined outline may then be established as a ROI and the user may then select whether the ROI is a positive or negative ROI. In this example, the ROIs 420, 422 are defined around objects of interest in the image, and so the user may identify each as a positive ROI. However, if the user defines an ROI around a bright light, they may identify the ROI as a negative ROI.

Other examples may use a more automated process. For example, the device may include certain image processing modules to identify objects within an image. For example, one or more machine learning algorithms may execute on the device to identify faces, people, pets, or other objects of interests. After recognizing one or more objects in the image, the device may display the image, e.g., on a touch screen, for the user to view and provide outlines for the identified objects with corresponding recommendations as either positive or negative ROIs. The user may then select one or more of the identified objects and a corresponding ROI setting, e.g., a positive or negative ROI, and, in some examples, adjust the outline for the ROI. After receiving the user selection, the device may define the ROI for the object using the corresponding outline. Further, in some examples, the device may automatically apply ROIs to an image based on user settings, e.g., a user setting to automatically apply ROIs to faces in an image.

After one or more ROIs are selected, the device may adjust gain or exposure settings for the image sensor, such as generally as discussed above with respect to FIGS. 2A-2B for positive ROIs or FIGS. 3A-3B for negative ROIs. The device may then capture a new image of the scene using the adjusted gain or exposure setting.

Figure 5:
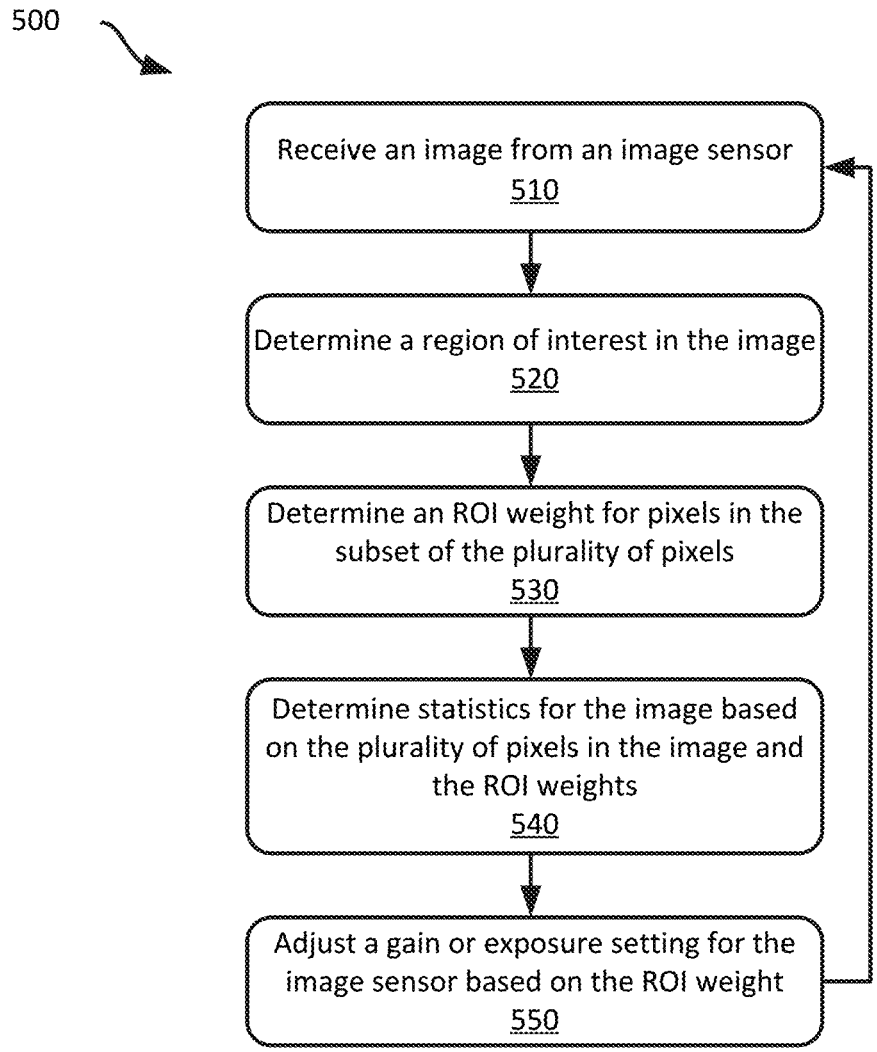
FIGS. 5-6 show example methods for region-of-interest automatic gain or exposure control.

Referring now to FIG. 5, FIG. 5 shows an example method 500 for region-of-interest automatic gain or exposure control. The example below will be discussed with respect to the example system 100 shown in FIG. 1A, but any suitable system according to this disclosure may be used according to different examples.

At block 510, a processor of the computing device 120 receives an image from an image sensor, the image comprising a plurality of pixels. In this example, the processor is within a camera, e.g., a user's smartphone or DSLR camera. In some examples, however, the computing device 120 may be part of an electronic device that is in communication with a camera, such as a computing device connected to one or more security cameras or an IoT device having a camera. In some examples, the processor may be integrated within the image sensor, such as described below with respect to FIG. 9. Suitable means for receiving an image from an image sensor, the image comprising a plurality of pixels may include computing devices 120, 700, or 820, or the peripheral circuitry 914 or microprocessor 916 of the camera 910 shown in FIG. 9.

At block 520, the processor determines a ROI within the received image. In this example, the processor receives a selection of an ROI from a user via a user interface device, e.g., a touch screen; however, in some examples, the ROI or automatically determined, such as using the techniques described above with respect to FIGS. 3A-3B.

In some examples, the processor may determine multiple ROIs in a single image. For example, multiple regions within the image may be selected by a user interacting with a user interface. In some examples, the processor may identify multiple regions in the image with groups of saturated pixels. The processor may then define ROIs corresponding to each of these regions.

In addition to identifying a ROI, the processor may establish whether the ROI is a positive ROI or a negative ROI. As discussed above, a positive ROI includes pixels to be weighted more heavily than other pixels not in an ROI, while a negative ROI includes pixels to be weighted less than other pixels (or not at all) that are not in an ROI. The processor may establish such positive or negative ROIs based on user input. In one example where the processor automatically identifies regions of saturated (or nearly saturated) pixels, the processor may automatically identify the ROI as a negative ROI.

Figure 7:
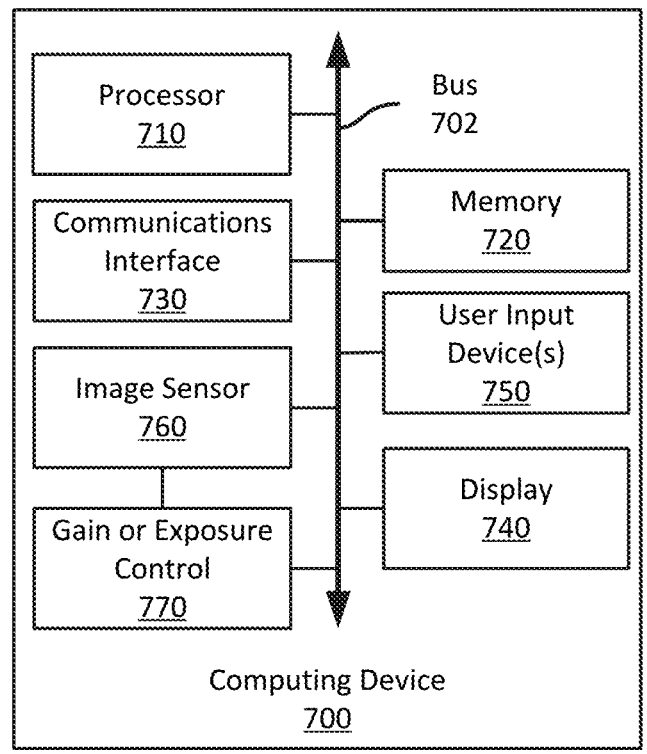
FIGS. 7-8 show example computing devices for region-of-interest automatic gain or exposure control.
Figure 9:
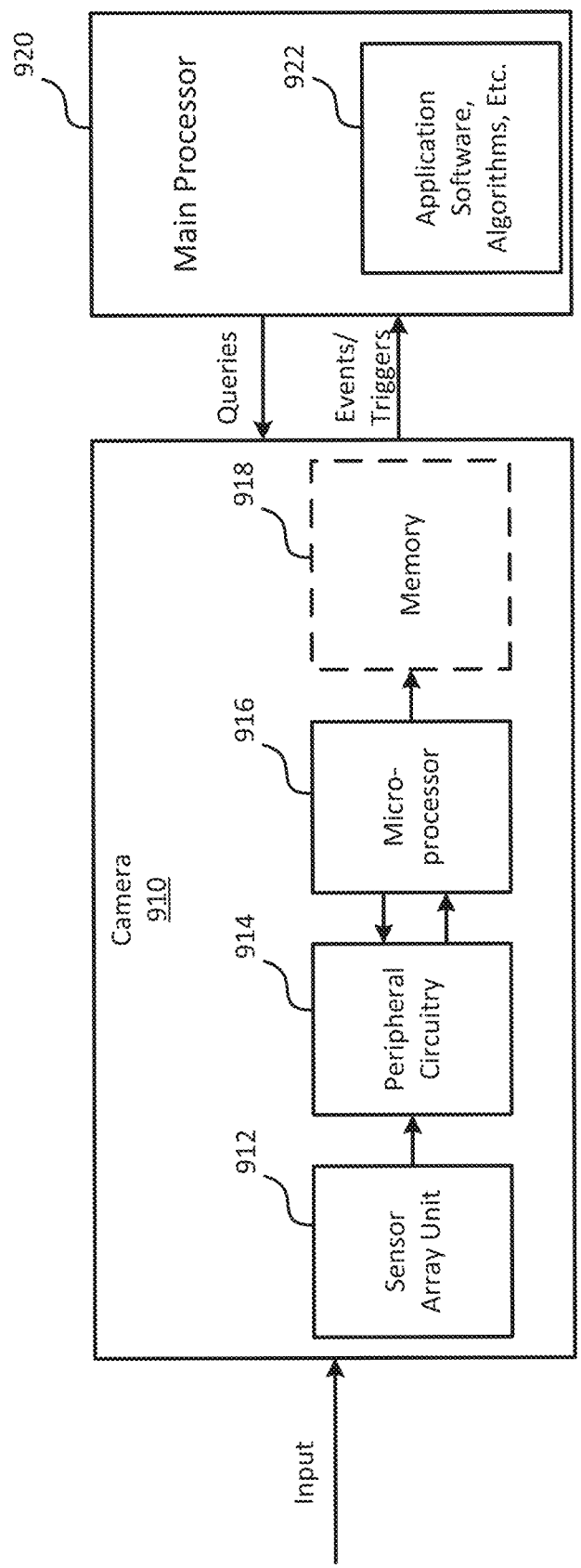
FIG. 9 illustrates an example of a camera suitable for use with examples according to this disclosure.

Suitable means for determining a ROI within the received image may include computing devices 120, 700, or 820, or the user input device(s) 750 shown in FIG. 7, or the peripheral circuitry 914 or microprocessor 916 of the camera 910 shown in FIG. 9. Such means may include the techniques to automatically generate an ROI discussed above with respect to FIGS. 3A-3B.

At block 530, the processor determines a ROI weight for pixels in the subset of the plurality of pixels. For example, as discussed above with respect to FIGS. 2A-2B and 3A-3B, the processor creates a weight for each pixel within the ROI, e.g., based on a preset value or a predetermined ratio between pixels in the ROI and pixels not in any ROI. For example, a positive ROI weight may be selected based on a predetermined ratio of 4:1 between pixels in the ROI and pixels not in any ROI, respectively. In some examples, the weights may further be adjusted by a user using a GUI.

In examples, a negative ROI may be employed. In such an example, the processor may determine an ROI weight between 0 and 1 to reduce the impact of pixels in the ROI on the statistics determined at block 540. For example, the ROI weight may be set to 0 for negative ROIs with saturated pixels (e.g., with a 100% maximum pixel value), or to 0.25 for negative ROIs with nearly saturated pixels (e.g., with a 90%-95% maximum pixel value), etc.

In some examples, the processor may also establish a weight for pixels not within the ROI or for all pixels within the image, as discussed above with respect to FIGS. 2A-2B and 3A-3B. For example, all pixels in an image may be initially assigned a weight of 1 based on the 4:1 ratio mentioned above, or they may be assigned a default weight of 1 in all cases. In some examples, however, to achieve any arbitrary ratio, e.g., 7:3, any suitable default weight may be assigned to pixels in the image according to the ratio, e.g., 3. The ROI weight may then be determined to be 7, or, in cases where the ROI weight is added to the default weight of pixels in the ROI, the ROI weight may be determined to be 4.

As discussed above, the processor may establish more than one ROI. In some examples, the processor may then establish weights for pixels in each of the ROIs as discussed above with respect to block 530. In cases where ROIs overlap, the overlapping regions may have only a single weight applied to them rather than multiple weights added, which might negatively impact image statistics computed at block 540. In cases where each of the overlapping ROIs has the same ROI weight, that ROI weight may be assigned (once) to the pixels in the overlapping region. If the overlapping ROIs have different ROI weights, the pixels in the overlapping ROI region may be assigned an ROI weight of one of the corresponding ROIs. In some examples, the ROI weights of any overlapping ROIs may be averaged to create an averaged ROI weight to be applied to the pixels in the overlapping ROI region. In cases where negatives ROIs are employed, overlapping ROIs may result in negative ROI values. In some such examples, the processor may set any negative ROI values to a predetermined value, such as 0, to prevent computation problems with respect to statistics determined at block 540.

Suitable means for determining a ROI weight for pixels in the subset of the plurality of pixels may include computing devices 120, 700, or 820, or the user input device(s) 750 shown in FIG. 7, or the peripheral circuitry 914 or microprocessor 916 of the camera 910 shown in FIG. 9. Suitable means may include techniques to add or subtract weight values, such as discussed above with respect to FIG. 5, e.g., determining an ROI weight of 4 by subtracting the default weight of 3 from the desired total ROI weight of 7. Further, in the case of overlapping ROIs, suitable means may include techniques to apply only one weight to pixels in the overlapping ROI region(s) and, optionally, to compute an average ROI weight to be applied to such pixels.

At block 540, the processor determines one or more statistics for the image based on the plurality of pixels in the image and the ROI weights. Any suitable statistics may be determined according to different examples. For example, the processor may determine an average pixel brightness using each weighted pixel value in the image. For example, for each pixel, the processor may multiply the corresponding pixel value with the assigned weight for the pixel to determine a weighted pixel value for the pixel. The processor may then sum all the weighted pixel values and divide by the total number of pixels in the image. Other suitable statistics may be the weighted sum of all pixel values or the weighted sum of all pixels squared. Suitable means for determines one or more statistics for the image based on the plurality of pixels in the image and the ROI weights may include computing devices 120, 700, or 820, or the user input device(s) 750 shown in FIG. 7, or the peripheral circuitry 914 or microprocessor 916 of the camera 910 shown in FIG. 9, in conjunction with the techniques discussed with respect to block 540 and related techniques discussed above with respect to FIGS. 2A-2B and 3A-3B.

At block 550, the processor adjusts a gain or exposure setting for the image sensor based on the statistics. In this example, the processor calculates weighted pixel statistics using the weights determined at block 530 as discussed above with respect to block 540. After computing the statistics, the processor may compare the statistics against one or more thresholds and establish a gain or exposure setting based on the comparison. For example, the processor may have a target average pixel brightness value of 175. It may then determine a difference between the computed weighted average pixel brightness statistic and the target value and then adjust the gain or exposure based on the difference between the two values. If the computed weighted average pixel brightness is 200 at a gain setting of 0.75 (with a normalized range from 0 to 1), the processor may use linear interpolation to determine a new gain setting of 0.65625. The gain setting may then be used to capture an additional image. Adjustments to exposure timing may be performed according to a similar process, discussed above with respect to FIG. 2A.

After completing the processing at block 550, the processor may repeat the method 500 on the next or another subsequently received image.

Figure 6:
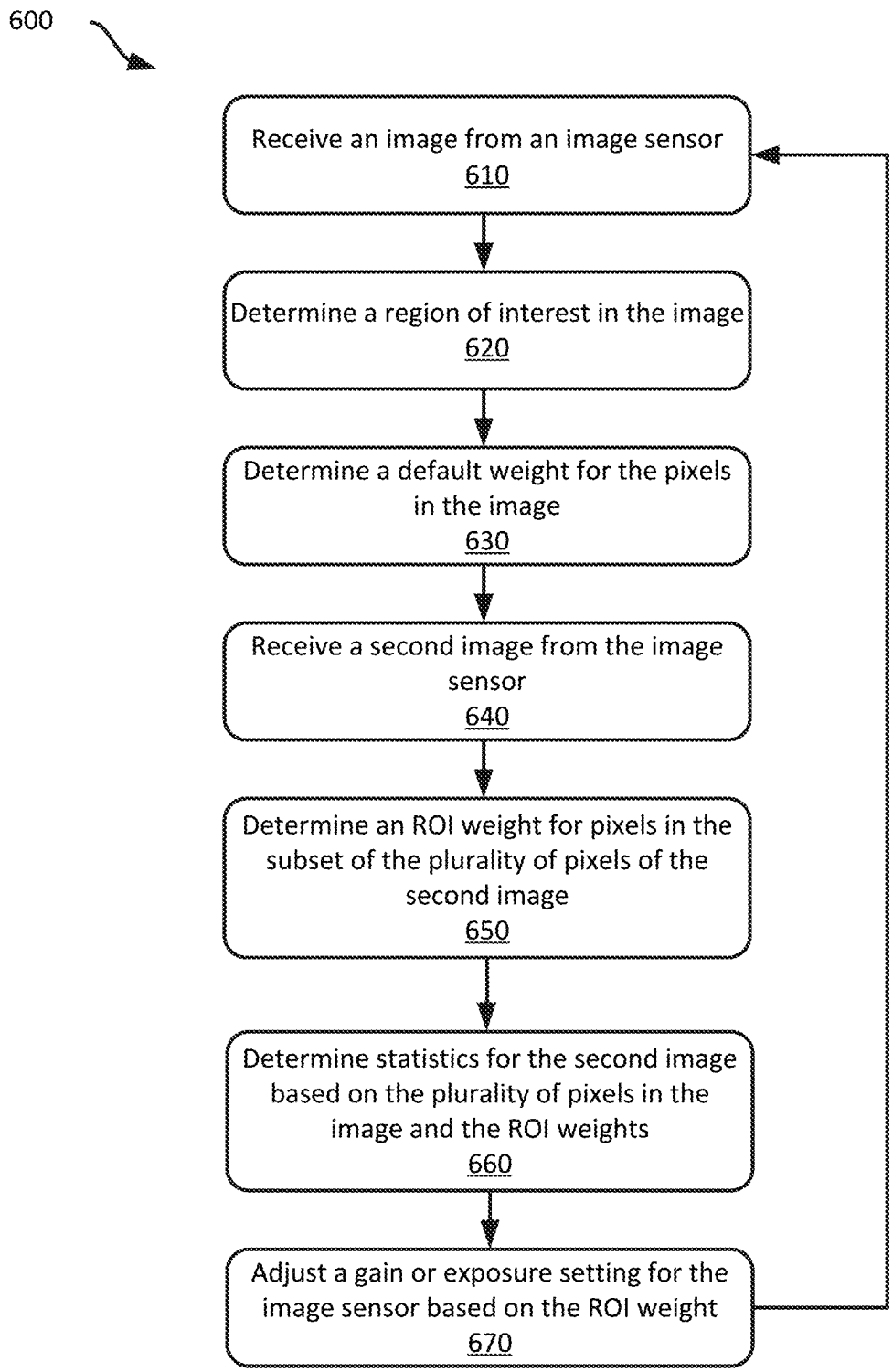

Referring now to FIG. 6, FIG. 6 shows an example method 600 for ROI automatic gain or exposure control. The example below will be discussed with respect to the example system 100 shown in FIG. 1A, but any suitable system according to this disclosure may be used according to different examples.

At block 610, a processor receives an image from an image sensor, the image comprising a plurality of pixels, generally as described above with respect to block 510 in FIG. 5.

At block 620, the processor determines a ROI within the received image generally as discussed above with respect to block 520 in FIG. 5.

At block 630, the processor determines a default weight for pixels in the image. In this example, the default weight is set to 1. However, depending on an established ratio for ROI weight to default weight, the default weight may be set to any suitable value. After determining the default weight, the processor assigns the default weight to each pixel in the image.

At block 640, the processor receives a second image from the image sensor, the second image comprising a second plurality of pixels, generally as described above with respect to block 510 in FIG. 5.

At block 650, the processor determines a ROI weight for pixels located within the ROI image generally as discussed above with respect to block 530 in FIG. 5.

At block 660, the processor determines statistics for the second image based on the plurality of pixels in the image and the ROI weights generally as discussed above with respect to block 540 in FIG. 5.

At block 670, the processor adjusts a gain or exposure setting for the image sensor based on the statistics generally as discussed above with respect to block 550 of FIG. 5. After adjusting the gain or exposure setting, a new image is captured by the image sensor using the gain or exposure setting and is received by the processor.

The ordering of blocks in FIG. 5 is illustrative only and is not required. For example, determining the ROI at block 620 may occur after either of the first or second images is received. Further, the determining the default weights at block 620 may be performed with the second image, while the ROI weights may be determined at block 630 with respect to the first image. Still other orderings may be used as appropriate according to different examples.

Referring now to FIG. 7, FIG. 7 illustrates shows an example computing device 700 suitable for use in example systems or methods for region-of-interest automatic gain or exposure control according to this disclosure. For example, computing device 120 shown in FIG. 1 may be configured based on the example computing device 700 shown in FIG. 7. The example computing device 700 includes a processor 710 which is in communication with the memory 720 and other components of the computing device 700 using one or more communications buses 602. The processor 710 is configured to execute processor-executable instructions stored in the memory 720 to perform one or more methods for region-of-interest automatic gain or exposure control according to different examples, such as part or all of the example methods 500, 600 described above with respect to FIGS. 4 and 5. The computing device, in this example, also includes one or more user input devices 750, such as a keyboard, mouse, touchscreen, microphone, camera (e.g., to enable gesture inputs), etc., to accept user input. The computing device 700 also includes a display 740 to provide visual output to a user.

Example computing devices may have any suitable form factor. For example, suitable computing devices include desktop computers and laptop computers. In some examples, the computing device may be integrated within or in communication with a wearable device, such as an AR or VR headset, which in turn may include one or more cameras. Other examples include handheld computing devices such as smartphones, tablets, and phablets. Some example computing devices may be integrated within a camera device, such as a hand-held digital single-lens-reflex ("DSLR") camera, a hand-held video camera, a security camera, an occupancy sensing camera or system, a doorbell camera, etc. Further computing devices according to this disclosure may be in communication with other computing devices via communications interface 730.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Such networks may include BT or BLE, WiFi, cellular or other WWANs (including 3G/4G/5G cellular), NB-IoT, CIoT, Ethernet, USB, Firewire, and others, such as those discussed above with respect to FIG. 1. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP. Such a communications interface may be a means for receiving an image of a scene. For example, as shown and described with respect to FIG. 1, an image sensor 110 may capture images and transmit them to a computing device 120 via a communications link (e.g., communications link 820 shown in FIG. 8). Thus, a communications interface 730 may enable receipt of such images from a camera or image sensor. In examples where the computing device 700 includes an image sensor 760, bus 602 or the processor 710 may be a means for receiving an image of a scene.

The computing device also includes an image sensor 760 and gain or exposure control 770. The image sensor 760 may be any suitable camera or image sensor and may be configured to supply video to the computing device or it may be used to capture discrete images, depending on a particular mode of operation. Further, it should be appreciated, that the image sensor 760 is optional and may be part of some example computing devices according to this disclosure or may be separate from the computing device, such as shown in FIG. 1. Further, in some examples, the image sensor 760 may include a low-power device, such as the example described in more detail with respect to FIG. 9 below.

Gain or exposure control 770 includes processor-executable instructions configured to cause the processor 710 to perform processing and methods disclosed herein. For example, gain or exposure control 770 may be configured to perform methods or functionality as discussed above, such as with respect to FIG. 2A-2B or 3A-3B. Further, gain or exposure control 770 may be configured according to the example methods 500, 600 discussed above with respect to FIGS. 4 and 5. In still other examples, gain or exposure control 770 may be configured according to any suitable example according to this disclosure.

It should be appreciated that all aspects of the computing device shown in FIG. 7 are not required in every example. For example, a suitable computing device 700 may be a server in a cloud computing environment that lacks a display 740, an image sensor 760, and user interface devices 750.

Figure 8:
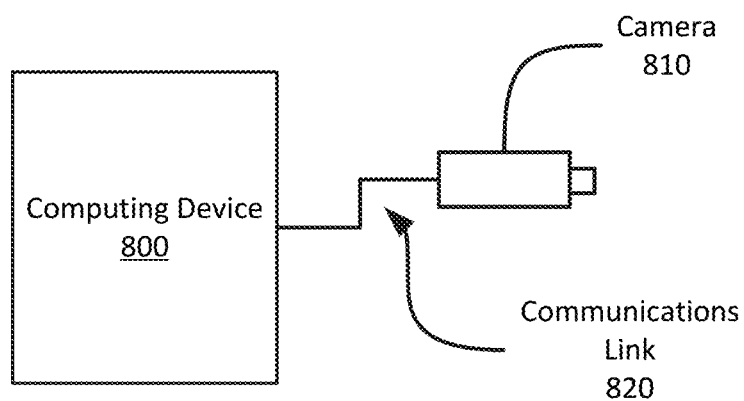

FIG. 8 shows an example in which the computing device 800 does not include an image sensor, but instead, is in communication with a camera 810 via a communications link, which may be wired or wireless. The computing device 800 receives images from the camera 810 via the communications link. Gain or exposure control may be handled at the computing device 800, which may be any suitable computing device according to this disclosure, or the camera 810 in different embodiments. For example, the computing device 800 may send one or more signals to the camera 810 to adjust gain or exposure settings. Still further variations may be employed as well.

Referring now to FIG. 9, FIG. 9 illustrates an example of a camera 910, which is another example means for capturing images, suitable for use with examples according to this disclosure. In this example, the camera 910 makes up a sensing system that can perform aspects of automatic gain or exposure control discussed above. Thus, the camera 910 may form a special-purpose camera that includes certain pixel-level computer vision functionality. Further, in this example, the camera 910 is a low power camera ("low power" referring to electrical power consumption, rather than computational power) that may remain active even if other portions of the computing device are in a sleep or standby mode.

Examples of the camera 910 may or may not include peripheral circuitry 914, a microprocessor 916, and/or memory 918. Additionally or alternatively, examples may combine, separate, add, omit, and/or rearrange the components of FIG. 9, depending on desired functionality. For example, where the camera 910 comprises a sensor array (e.g., a pixel array), some optics may be utilized to manipulate the input (e.g., light) before it reaches the sensor array.

As illustrated in FIG. 9, a camera 910 receiving an input can comprise a sensor array unit 912, peripheral circuitry 914, microprocessor 916, and/or memory 918. The camera 910 can be communicatively coupled through either a wired or wireless connection with a main processor 920 of an electronic device, such as the example computing device 700 shown in FIG. 7, which can provide queries to the camera 910 and receive events and/or other triggers from the camera 910. In some embodiments the main processor 920 may simply correspond to a larger (e.g., greater in processing power and/or greater in electric power use) processing unit than the microprocessor 916. In some implementations, microprocessor 916 can correspond to a dedicated microprocessor or a first processing unit and can be configured to consume less electrical power than the main processor 920, which can correspond to a second processing unit. In various embodiments, functionality may be distributed in various ways across the microprocessor 916 and the main processor 920.

The type of sensor array unit 912 utilized can vary, depending on the desired functionality of the electronic sensor. As previously indicated, a sensor array unit 912 can include an array (e.g., a two-dimensional array) of sensor cells for sensing visual information. For example, the sensor array unit 912 can comprise a camera sensor or other vision and/or sensor array where the plurality of sensor cells forms a grid of pixels.

In some embodiments, the sensor array unit 912 may include a "smart" array, that includes some additional memory and/or logic circuitry with which operations on one or more outputs of the sensor cells may be performed. In some embodiments, each sensor pixel in the sensor array may be coupled with the memory and/or logic circuitry, which may or may not be part of the peripheral circuitry 914 (discussed in more detail below). The output of the sensor array unit 912 and/or peripheral circuitry may include outputs in addition or as an alternative to the raw sensor readings of the sensor cells. For example, in some embodiments, the sensor array unit 912 and/or peripheral circuitry can include dedicated CV computation hardware configured to receive image data from a sensor array of the sensor array unit 912 comprising more than one sensor pixel. CV features can then be computed or extracted by the dedicated CV computation hardware using readings from neighboring sensor pixels of the sensor array, providing outputs such as a computed HSG and/or an LBP feature, label, or descriptor. In some embodiments, no image signal processing circuitry may be disposed between the sensor array unit 912 and the dedicated CV computation hardware. Put differently, dedicated CV computation hardware may receive raw sensor data from the sensor array unit 912 before any image signal processing is performed on the raw sensor data. Other CV computations are also possible based on other CV computation algorithms including applying weights or ROI weights to pixel values, computing image statistics, and determining gain or exposure settings, such as discussed above with respect to FIGS. 2A-2B, 3A-3B, 4, and 5.

The synchronicity (or asynchronicity) of the sensor array unit 912 may also depend on desired functionality. In some embodiments, for example, the sensor array unit 912 may comprise a traditional (i.e., "frame-based") camera with readout circuitry timed to provide periodic sampling of each pixel based on certain timing requirements. In some embodiments, the sensor array unit 912 may comprise an event-driven array by which sensor output may be determined by when a sensor reading or other output reaches a certain threshold and/or changes by a certain threshold, rather than (or in addition to) adhering to a particular sampling rate. For a "smart" array, as discussed above, the sensor reading or other output could include the output of the additional memory and/or logic (e.g., an HSG or LBP output from a smart sensor array). In one embodiment, a smart sensor array can comprise a dynamic vision sensor (DVS) in which, for each pixel in the smart sensor array, a pixel value is asynchronously output when the value changes from a previous value by a threshold amount. In some implementations, the sensor array unit 912 can be a hybrid frame-event-driven array that reads values out at a given frame rate, but saves electrical power by only reading out values for elements in the array that have changed since the previous read-out.

The peripheral circuitry 914 can also vary, depending on the desired functionality of the electronic sensor. The peripheral circuitry 914 can be configured to receive information from the sensor array unit 912. In some embodiments, the peripheral circuitry 914 may receive information from some or all pixels within the sensor array unit 912, some or all of the in-pixel circuitry of the sensor array unit 912 (in implementations with significant in-pixel circuitry), or both. In embodiments where the sensor array unit 912 provides a synchronized output, for example, peripheral circuitry 914 can provide timing and/or control operations on the sensor array unit output (e.g., execute frame-based and/or similar timing). Other functionality provided by the peripheral circuitry 914 can include an event-queuing and/or processing operation, analog processing, analog-to-digital conversion, an integration operation (e.g. a one- or two-dimensional integration of pixel values), pixel weighting, image statistics computation, gain or exposure control, CV feature computation, object classification (for example, cascade-classifier-based classification or histogram-based classification), or histogram operation, memory buffering, or any combination thereof, "pixel block value summation," "neighboring pixel value comparison and thresholding," "vector dot product computation," and the like. Means for performing such functionality, e.g., determining one or more ROIs, determining pixel weights, applying pixel weights, modifying pixels weights, determining image statistics, adjusting gain or exposure settings, etc. can include, for example, peripheral circuitry 914, in various implementations. In some embodiments, the peripheral circuitry 914 is coupled to the sensor cell outputs of the sensor array unit 912 and does not include a microprocessor or other processing unit.

In some examples, the camera 910 can further include a microprocessor 916 coupled to the output of the peripheral circuitry 914. The microprocessor 916 generally can comprise a processing unit that operates on relatively low power, relative to the main processor 920. In some implementations, the microprocessor 916 can further execute computer vision and/or machine-learning algorithms, e.g., determining one or more ROIs, determining pixel weights, applying pixel weights, modifying pixels weights, determining image statistics, adjusting gain or exposure settings, etc., (which can be frame- and/or event-based) using its own program (for example, software-based) and data memory. Thus, the microprocessor 916 is able to perform computer vision and/or machine learning functions based on input received by the sensor array unit 912 while the main processor 920 operates in a low-power mode. When the microprocessor 916 determines that an event requiring output to the main processor 920 has taken place, the microprocessor 916 can communicate an event to the main processor 920, which can bring the main processor 920 out of its low-power mode and into a normal operating mode.

Optionally, in some embodiments, the output of the microprocessor 916 may further be provided to memory 918 before being relayed to the main processor 920. In some implementations, memory 918 may be shared between microprocessor 916 and main processor 920. The memory 918 may include working memory and/or data structures maintained by the microprocessor 916 on the basis of which events or triggers are sent to the main processor 920. Memory may be utilized, for example, in storing images, tracking detected objects, and/or performing other operations. Additionally or alternatively, memory 918 can include information that the main processor 920 may query from the camera 910. The main processor 920 can execute application software, algorithms, etc. 922, some of which may further utilize information received from the camera 910.

As previously noted, the ability of the camera 910 to perform certain functions, such as image processing and/or computer vision functions, independent of the main processor 920 can provide for vast power, speed, and memory savings in an electronic device that would otherwise have to utilize the main processor 920 to perform some or all of the functions of the camera 910. In particular, the combination, of the sensor array unit 912, peripheral circuitry 914, and microprocessor 916 allow scene understanding that is capable of detecting, in a dynamically changing scene captured by the image array, an occurrence.

In one example, computing device employing the configuration shown in FIG. 9 can perform ROI determination, pixel weighting, image statistics calculation, and gain or exposure control adjustments upon detecting changes in pixel values, e.g., of a threshold number of pixels. In this example, the computing device enters into a standby mode in which the main processor 920 operates on a low-power sleep mode. However, the camera 910 with an image array as the sensor array unit 912 continues to operate, processing data from the sensor array unit 912 as objects enter and exit the image array's field of view. When changes in the field of view of the image array (e.g., when an object enters into the field of view), it may be detected by the sensor array unit 912, the peripheral circuitry 914, the microprocessor 916, or any combination thereof. which may then perform ROI determination, pixel weighting, image statistics calculation, and gain or exposure control adjustments, such as described above with respect to FIGS. 2A-2B, 3A-3B, 4, and 5. The microprocessor 916 can then send determined ROI information, pixel weights, image statistics, or gain or exposure control settings to the main processor 920, which can then reactivate to store the such information or provide it to a cloud system. Further, in some examples, the camera 910 may only provide pixel weighting or image statistics determination. The camera 910 may provide a captured image and such pixel weights, weighted pixel values, or image statistics to the main processor 920, which may then perform gain or exposure adjustments for the camera 910, generally as discussed above with respect to FIGS. 2A-2B, 3A-3B, 4, and 5.

Thus, as described with respect to FIG. 9, example cameras 910 according to this disclosure may include one or more of means for receiving an image from an image sensor (e.g., sensor array unit 912), the image comprising a plurality of pixels, means for determining a region of interest ("ROI") in the image based on brightness levels of the plurality of pixels in the image, the ROI comprising a subset of the plurality of pixels in the image, means for adjusting a weight of the subset of the plurality of pixels, or means for adjusting a gain or exposure setting for the image sensor based on the weight. Such example cameras may provide low power operation while allowing a main processor 920 within a computing device, e.g., computing device 700, to remain in a sleep mode or to perform other activities while the camera 910 itself performs aspects of region-of-interest automatic gain or exposure control according to this disclosure.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices or systems-on-a-chip and may include devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method comprising:
    receiving a first image from an image sensor, the first image captured with a first field of view (FOV) and comprising a first plurality of pixels;
    applying first weights to the first plurality of pixels;
    receiving a second image from the image sensor, the second image captured with a second FOV and comprising a second plurality of pixels;
    determining a region of interest (ROI) in the second image, the ROI in the second image comprising a subset of the second plurality of pixels in the second image;
    determining an ROI weight for the ROI in the second image, wherein the ROI weight for the ROI in the second image comprises a combination of the first weights applied to the first plurality of pixels and an ROI value;
    determining statistics based on the first plurality of pixels in the first image, the subset of the second plurality of pixels in the second image, and the ROI weight for the ROI in the second image; and
    adjusting a gain or exposure setting for the image sensor based on the statistics.

2. The method of claim 1, wherein the first image with the first FOV and the second image with the second FOV are captured by a camera moving along a path.

3. The method of claim 2, wherein the path is a fixed path, and the first image and the second image are captured by the camera as the camera sweeps the fixed path.

4. The method of claim 1 comprising receiving a third image from the image sensor, the third image based on the gain or exposure setting.

5. The method of claim 1, wherein determining the statistics comprises combining (a) weighted pixel values for the first plurality of pixels in the first image based on the first weights and (b) weighted pixel values for the subset of the second plurality of pixels in the second image based on the ROI weight.

6. The method of claim 5, wherein the first image is received before the second image.

7. The method of claim 1, wherein the subset of the second plurality of pixels is a first subset of the second plurality of pixels in the second image, the method further comprising:
    determining a second ROI in the second image, the second ROI comprising a second subset of the second plurality of pixels in the second image; and
    determining a second ROI weight of pixels in the second subset of the second plurality of pixels; and
    wherein determining the statistics is further based on the second subset of the second plurality of pixels and the second ROI weight.

8. The method of claim 1, wherein determining the statistics comprises determining one of an average brightness value, a total brightness value, or a total squared brightness value.

9. The method of claim 1, further comprising receiving a user input identifying an object in the second image to define the ROI.

10. A device comprising:
    a non-transitory computer-readable medium; and
    a processor communicatively coupled to the non-transitory computer-readable medium, the processor configured to:
        receive a first image from an image sensor, the first image captured with a first field of view (FOV) and comprising a first plurality of pixels;
        apply first weights to the first plurality of pixels;
        receive a second image from the image sensor, the second image captured with a second FOV and comprising a second plurality of pixels;
        determine a region of interest (ROI) in the second image, the ROI in the second image comprising a subset of the second plurality of pixels in the second image;
        determine an ROI weight for the ROI in the second image, wherein the ROI weight for the ROI in the second image comprises a combination of the first weights applied to the first plurality of pixels and an ROI value;
        determine statistics based on the first plurality of pixels in the first image, the subset of the second plurality of pixels in the second image, and the ROI weight for the ROI in the second image; and
        adjust a gain or exposure setting for the image sensor based on the statistics.

11. The device of claim 10, wherein the first image with the first FOV and the second image with the second FOV are captured by a camera moving along a path.

12. The device of claim 11, wherein the path is a fixed path, and the first image and the second image are captured by the camera as the camera sweeps the fixed path.

13. The device of claim 10, further comprising the image sensor.

14. The device of claim 10, wherein the processor is further configured to receive a third image from the image sensor, the third image based on the gain or exposure setting.

15. The device of claim 10, wherein the processor is configured to determine the statistics by combining (a) weighted pixel values for the first plurality of pixels in the first image based on the first weights and (b) weighted pixel values for the subset of the second plurality of pixels in the second image based on the ROI weight.

16. The device of claim 15, wherein the processor is configured to receive the first image before the second image.

17. The device of claim 10, wherein the subset of the second plurality of pixels is a first subset of the second plurality of pixels in the second image, and the processor is further configured to:
    determine a second ROI in the second image, the second ROI comprising a second subset of the second plurality of pixels in the second image; and
    determine a second ROI weight of pixels in the second subset of the second plurality of pixels; and
    wherein the processor is further configured to determine the statistics further based on the second subset of the second plurality of pixels and the second ROI weight.

18. The device of claim 10, wherein the processor is further configured to determine the statistics by determining one of an average brightness value, a total brightness value, or a total squared brightness value.

19. A non-transitory computer-readable medium comprising processor-executable instructions configured to cause a processor to:
    receive a first image from an image sensor, the first image captured with a first field of view (FOV) and comprising a first plurality of pixels;
    apply first weights to the first plurality of pixels;
    receive a second image from the image sensor, the second image captured with a second FOV and comprising a second plurality of pixels;
    determine a region of interest (ROI) in the second image, the ROI in the second image comprising a subset of the second plurality of pixels in the second image;
    determine an ROI weight for the ROI in the second image, wherein the ROI weight for the ROI in the second image comprises a combination of the first weights applied to the first plurality of pixels and an ROI value;
    determine statistics based on the first plurality of pixels in the first image, the subset of the second plurality of pixels in the second image, and the ROI weight for the ROI in the second image; and
    adjust a gain or exposure setting for the image sensor based on the statistics.

20. The non-transitory computer-readable medium of claim 19, further comprising processor-executable instructions configured to cause the processor to receive a third image from the image sensor, the third image based on the gain or exposure setting.

21. The non-transitory computer-readable medium of claim 19, further comprising processor-executable instructions configured to cause the processor to determine the statistics by combining (a) weighted pixel values for the first plurality of pixels in the first image based on the first weights and (b) weighted pixel values for the subset of the second plurality of pixels in the second image based on the ROI weight.

22. The non-transitory computer-readable medium of claim 21, wherein the processor-executable instructions are configured to cause the processor to receive the first image before the second image.

23. The non-transitory computer-readable medium of claim 19, wherein the subset of the second plurality of pixels is a first subset of the second plurality of pixels in the second image, the non-transitory computer-readable medium further comprising processor-executable instructions configured to cause the processor to:

determine a second ROI in the second image, the second ROI comprising a second subset of the second plurality of pixels in the second image; and determine a second ROI weight of pixels in the second subset of the second plurality of pixels; and wherein the processor-executable instructions are configured to cause the processor to determine the statistics further based on the second ROI weight.

24. The non-transitory computer-readable medium of claim 19, further comprising processor-executable instructions configured to cause the processor to determine the statistics by determining one of an average brightness value, a total brightness value, or a total squared brightness value.

25. An apparatus comprising:

means for receiving a first image from an image sensor, the first image captured with a first field of view (FOV) and comprising a first plurality of pixels;

means for applying first weights to the first plurality of pixels;

means for receiving a second image from the image sensor, the second image captured with a second FOV and comprising a second plurality of pixels;

means for determining a region of interest (ROI) in the second image, the ROI in the second image comprising a subset of the second plurality of pixels in the second image;

means for determining an ROI weight for the ROI in the second image, wherein the ROI weight for the ROI in the second image comprises a combination of the first weights applied to the first plurality of pixels and an ROI value;

means determining statistics based on the first plurality of pixels in the first image, the subset of the second plurality of pixels in the second image, and the ROI weight for the ROI in the second image; and means for adjusting a gain or exposure setting for the image sensor based on the statistics.

26. The apparatus of claim 25, further comprising means for capturing the first image and the second image.

* * * * *